Aug. 26, 1924.
J. H. BERRYMAN
1,505,940
SAFETY LOCK FOR BELT TIGHTENING MECHANISM
Filed Nov. 14, 1922    3 Sheets-Sheet 1
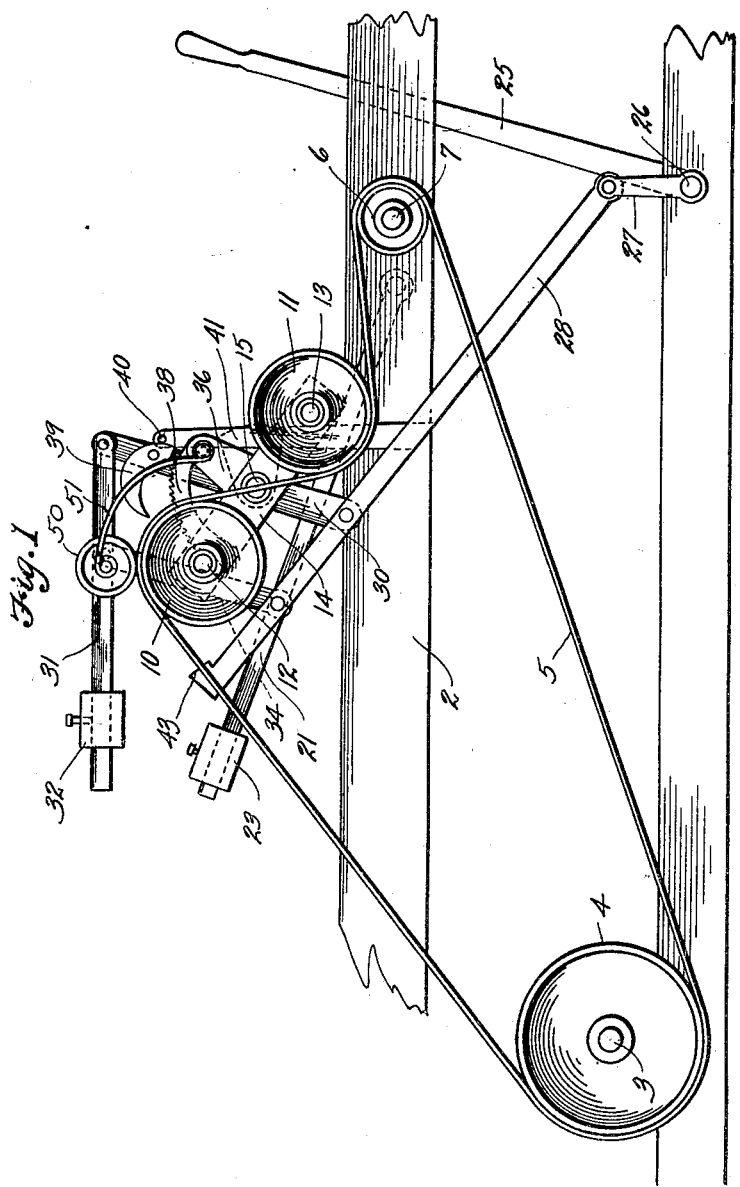
Inventor
JAMES H. BERRYMAN
By Attorney
Richard Cook

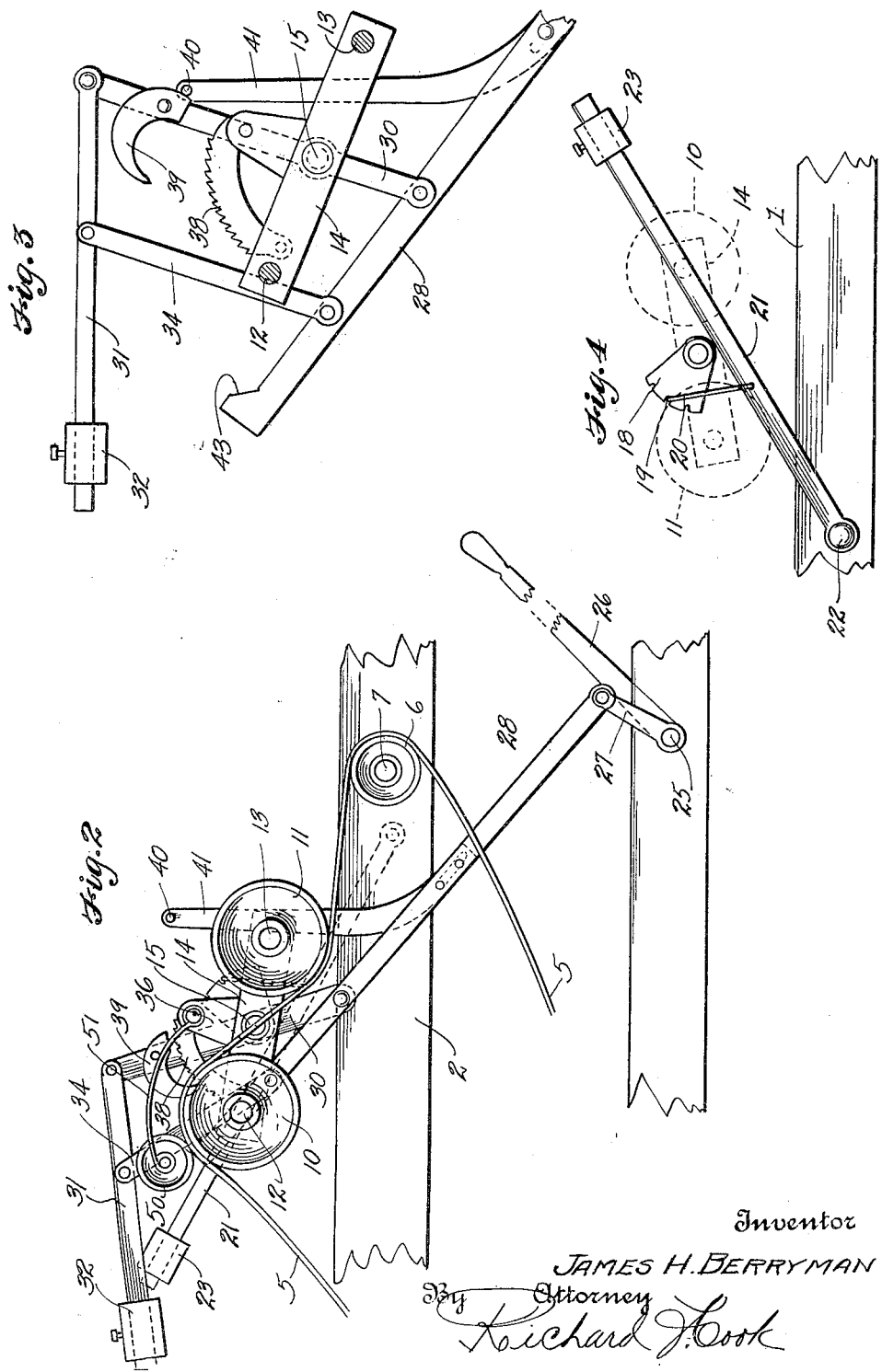

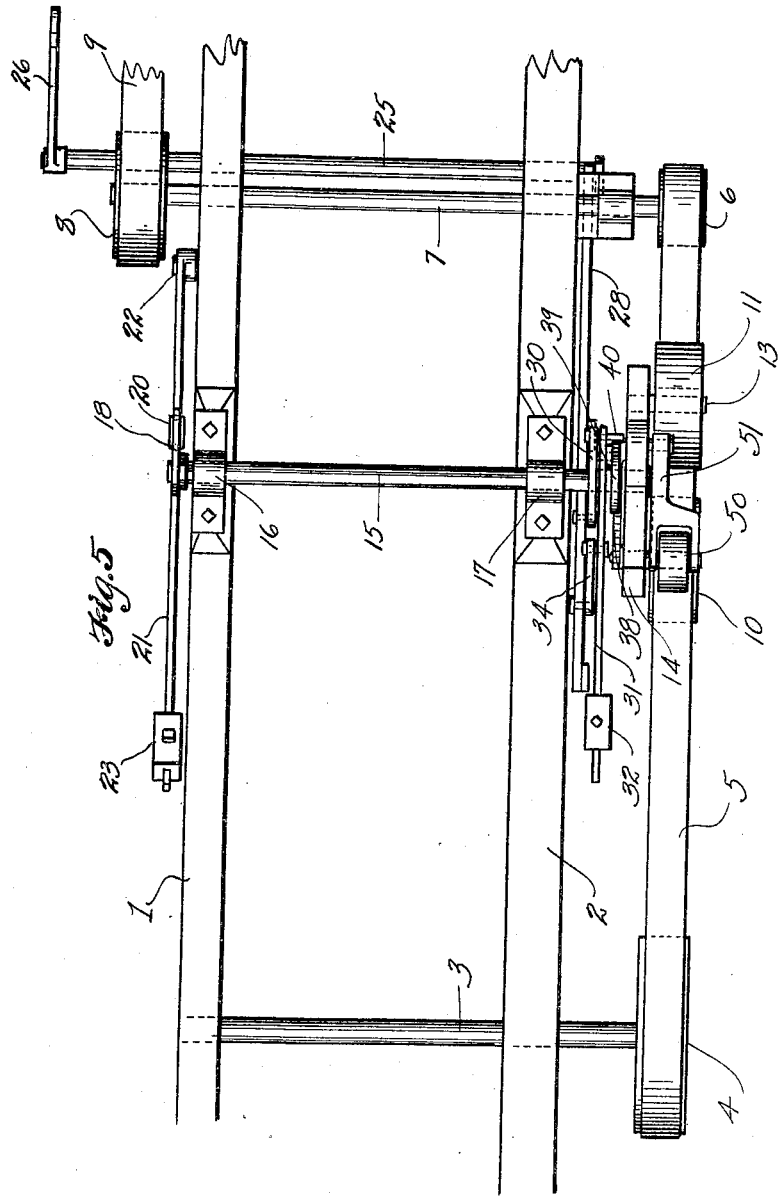

Patented Aug. 26, 1924.

1,505,940

UNITED STATES PATENT OFFICE.

JAMES H. BERRYMAN, OF SNOQUALMIE, WASHINGTON.

SAFETY LOCK FOR BELT-TIGHTENING MECHANISM.

Application filed November 14, 1922. Serial No. 600,955.

*To all whom it may concern:*

Be it known that I, JAMES H. BERRYMAN, a citizen of the United States, and a resident of Snoqualmie, county of King, and State of Washington, have invented certain new and useful Improvements in Safety Locks for Belt-Tightening Mechanism, of which the following is a specification.

This invention relates to improvements in saw mill machinery, and more particularly to safety mechanism to be used in connection with machines of that type known as the "Yates match planer," for preventing accidental starting after the machine has been stopped.

In the present type of machines, there is provided a starting and stopping mechanism which consists of means for tightening or loosening the driving belt; since it is desirable that the main drive belt run continuously, the parts are so arranged that when the belt is slackened the machine will stop, and when it is tightened, it will drive the machine.

The above mechanism has not been entirely satisfactory for the reason that the constant jar and vibration that is always very noticeable where many machines of this type are in operation sometimes causes the belt setting levers to shift into starting position and, due to this starting, damage to an operator might, and in many cases, has been the result.

In view of this undesirable feature of the present types of machines in use, it has been the object of this invention to provide a safety locking or setting mechanism whereby the belt tightening and loosening pulleys, when once set in "off" position, can not accidentally be released or moved by jar or vibration into the "on" position.

More specifically, the invention resides in the provision of mechanism for the above purpose that may be applied to all types of "Yates match planers" without alteration in their construction and which will readily adapt itself to changes in position made necessary by a change in the size of the main belt driving pulley.

Other objects of the invention reside in the various details of construction of the parts embodied in the device, in their combination and relation, and in the mode of operation which provides for safety in operation.

In accomplishing these and other objects of the invention, I have provided the improved details of construction, the preferred forms of which are illustrated in the accompanying drawings, wherein—

Figure 1 is a side view of a belt tightening mechanism with safety lock constructed in accordance with the present invention; showing the parts in "on" position whereby the belt is caused to be driven.

Figure 2 is a similar view showing the parts in "off" position, whereby the belt is loosened to prevent driving.

Figure 3 is a detail view of parts of the device which support the belt tightening pulleys, and the means for locking the same; the locking pawl being shown in "released" position as held when the machine is being driven.

Figure 4 is a detail view taken from the side of the machine opposite that shown in Figure 1, showing the weighted lever for yieldingly holding the belt tightening pulleys in "on" position.

Figure 5 is a plan view of the parts embodied in this invention; the planer parts to be driven by the belt not being illustrated.

Referring more in detail to the several views of the drawings—

1 and 2 designate parallel, opposite side beams of the machine frame wherein the planer parts are contained, and 3 designates a shaft supported transversely of the frame whereby the planer rolls, knives, etc., are to be driven. In order to simplify the drawings, and to avoid confusion, the driven parts of the planer are omitted since they do not form any part of the present invention and could be of various types, and would be connected in a suitable manner with the shaft 3.

The shaft 3 is equipped at one end with a driving pulley 4 over which a continuous belt 5 operates. This belt is extended about a smaller, driving pulley wheel 6 on one end of a transverse shaft 7, provided at its other end with a pulley 8 over which a driving belt 9 operates. The shaft 7 usually is continuously driven, and when the machine is to be stopped for clearing, or repairing, the belt 5 is loosened so as to cease driving pulley 4.

The means provided for tightening the belt, comprises two pulleys 10 and 11 disposed close together on opposite sides of the belt 5, and supported, freely revoluble, by stub shafts 12 and 13 fixed in opposite ends of a rocker bar 14 which is fixed at its center, on the end of a supporting shaft 15 that extends transversely of the machine and is rotatably mounted in any suitable manner, as in bearings 16 and 17 as shown in Figure 5.

At the side of the machine, opposite the belt, see Figure 4, a segment 18 is fixed to the end of the shaft 15, provided in its edge with a series of notches 19 for the seating of the upper end of a loop, or connecting link 20 therein. The link 20 is fixed at its lower end to a lever 21 that is pivotally fixed at one end by a pin 22 to the frame beam 1 and which has a weight 23 adjustable on its opposite end which causes a downward pull on the segment 18 and a consequent tendency to rotate shaft 15 in such manner as to cause tightening of the belt by the tightening thereagainst of pulleys 10 and 11. This is the means for normally effecting and maintaining a driving connection between the shafts 7 and 3, and in machines not equipped with my safety mechanism, the belt is loosened by mechanism, including a series of links and levers, connected with the shaft 15.

The present invention relates particularly to the mechanism shown in Figures 2 and 3, whereby the belt tightening pulleys, when in "off" position, are locked so that they can not accidentally be shifted to "on" position. This mechanism is controlled by a hand lever 25 which may be moved in opposite directions so as to effect the release or the setting of the locking mechanism.

The lever 25 is fixed at one end of a shaft 26 mounted transversely of the lower part of the machine. At the other end of the shaft is a short, upwardly extending lever arm 27 to which is pivotally fixed one end of an upwardly inclined bar 28. Rotatably mounted on the shaft 15, just within the rocker 14, is a lever 30 that is pivotally connected at its lower end to the bar 28 and at its upper end is pivotally fixed to a substantially horizontally supported lever 31 whereon a weight 32 is adjustable, and joining the lever 31 and bar 28 by being pivotally connected therewith at its ends, is a bar 34 which is spaced from and is substantially parallel with the lever 30. When the setting lever 26 is moved to "on" position, as shown in Figures 1 and 5, it shifts the levers 30 and 34 to such position that the downward pressure of weight 32 tends to hold it in this position. Likewise, when the lever 26 is shifted to move the parts to "off" position, as shown in Figure 2, the downward pressure of the weight tends to hold the parts in this position. This is due to the moving of the upper ends of the parts 30 and 34 to opposite sides of vertical lines through their points of support, or to opposite sides of a dead center position.

As before stated, when the pulleys are in "on" position, they are held there by the rotative force of weight 23 as applied to shaft 15 by the connections shown in Figure 4, and when in "off" position, as shown in Figure 2, they are held by the pressure provided for by the weight 32, through a locking mechanism which I will now describe.

Fixed to the inner side of the rocker bar 14 and to a post 36 centrally thereon, is a ratchet segment 38 and mounted pivotally, at a point between its ends, on the upper end portion of lever 30 is a semi-circular pawl 39, one end of which is adapted to lockingly engage the ratchet teeth. When the parts are in "on" position, as in Figure 1, this pawl is held released from the ratchet by means of a laterally extending pin 40 mounted in the upper end of a vertical arm 41 fixed adjustably to the rod 28, but with the initial movement of this rod 28, when the parts are moved to "off" position, the pin is disengaged from the pawl end to allow the pawl to drop into locking engagement with the ratchet. It is apparent then that, due to this connection, continued movement of the lever 25 toward "off" position will cause the rocker bar 14 to be moved so that pulleys 10 and 11 will remove tension on the belt, and the center of gravity as applied by weight 32 through parts 30 and 34 will be shifted to the left of dead center position, and will yieldingly hold the parts in this position. It is important in this construction to see that weight 32 is sufficiently heavy that it will overcome the force of weight 23 when parts are in "off" position. When in "on" position, the weight 23 acts alone. When in "off" position, the downward limit of the lever 31 and bar 34 is limited by the engagement of the latter with a laterally turned stop portion 43 at the upper end of bar 28.

In connection with this device, I have provided means for preventing movement of the belt due to friction contact and vibration of the belt. This comprises a small roller 50 that is supported by a lever 51 pivotally attached to the post 36. This roller rides upon the belt 5 at the top of pulley 10. It serves simply as a means of placing a sort of tension on the belt so that the later will not, due to heating or vibrating, cause any driving action.

Assuming that the parts are so constructed and assembled, and that the machine is being driven by the belt 5 operating over the driven pulley 6, if the operator wishes to stop the machine for any reason, he grasps lever 25 and moves it toward the right, from position shown in Figure 1 to that shown in Figure 2. This movement rotates shaft 26 and causes shifting of bar 28. With the initial movement of bar 28, the pin 40 at the upper end of arm 41 disengages the pawl 39 and allows it to drop into locking engagement with ratchet 38 to effect a connection between lever 30 and rocker 14, whereby farther shifting of bar 28 by lever 25 will cause rotative movement or rocker 14 on shaft 15 and this will move pulleys 10 and 11 to a position whereby the tension on the belt is removed and the driving connection with pulley 4 is discontinued. As the lever 25 is shifted, the levers 30 and 34 are shifted so that their upper ends move to the left across dead center, whereupon the pressure of weight 32 is then applied in such manner as to hold the parts in "off" position.

When it is again desired to start the machine, the lever 25 is shifted to the left, which pushes bar 28 to the left and swings upper ends of levers 30 and 34 to the right and shifts center of gravity of weight 32 to opposite side of dead center and the weight then acts to hold the parts in this position. As the parts move to this "off" position, the end of pawl 39 engages with pin 40 on arm 41 and is thereby raised to released relation with ratchet, and thereby permits the shaft 15 to rotate under the rotative force as applied thereto by weight 23 so that the pulleys 10 and 11 again put a tension on the driving belt.

It is seen now that it is not possible for the parts to be moved from "off" to "on" position except by actuation of lever 25, and that the usual vibration or jar will not be sufficient to do this.

It is readily apparent that various changes in details of construction could be made without departing from the spirit of the invention, and for this reason I do not wish to limit myself only to the details illustrated.

Such attachments can be adapted to all types of "Yates match planes," and can also be used with other machines which have a like system of control.

Having thus described my invention, what I claim as new therein and desire to secure by Letters Patent, is:

1. A device of the class described, comprising in combination with a driving belt, a belt tightening device, means connected with said device for normally maintaining driving tension on the belt, a setting mechanism manually movable between "off" and "on" positions, means attached to the said mechanism for yieldably retaining it in either set position, and a locking member carried by the setting mechanism for engaging and actuating the tightening device to remove driving tension from the belt when the said setting mechanism is shifted from "on" to "off" position and a releasing member positioned to engage with the locking member to move the latter to released position when the setting mechanism is moved from "off" to "on" position.

2. A device of the class described, comprising in combination with a driving belt, a rotatably supported belt tightening device, means connected with said device for normally maintaining driving tension on the belt, a ratchet member carried by the tightening device, a setting mechanism manually movable between "off" and "on" positions, means for yieldingly retaining it in either set position, a pawl carried by the setting mechanism for engaging said ratchet when the setting mechanism is shifted from "on" to "off" position to effect rotation of the belt tightening device whereby driving tension will be removed from the belt.

3. A device of the class described, comprising in combination with a driving belt, a rotatably supported belt tightening device, means connected therewith for normally maintaining driving tension on the belt, a ratchet member carried by the tightening device, a setting mechanism manually movable between "off" and "on" positions, means for yieldingly retaining the setting mechanism in set positions, a pawl carried by the setting mechanism engagable with said ratchet when the setting mechanism is shifted from "on" to "off" position to effect rotation of the belt tightening device to remove driving tension from the belt, and a stop member for engaging the pawl when the setting mechanism is returned to "on" position to lift the pawl free from the ratchet.

4. In a device of the class described, the combination with a driving belt and a belt tightening device comprising a freely rotatable shaft, an arm fixed to the shaft, belt tightening pulleys mounted on the arm, a weighted lever fixed to the shaft whereby driving tension is normally maintained on the belt, a ratchet member fixed to the pulley supporting arm, a manually shiftable setting mechanism comprising a lever pivotally mounted on the said shaft adjacent the ratchet, a pawl pivotally mounted on the said lever, a stop member engagable by the pawl when the setting mechanism is in "on" position to retain the pawl free of the ratchet, and a shifting rod connected with the lever whereby the latter may be moved to release the pawl from the stop for engagement with the ratchet to effect movement of the tightening device whereby tension on the belt will be removed.

5. In a device of the class described, the combination with a driving belt and a belt tightening device comprising a freely rotatable shaft, an arm fixed to the shaft, belt tightening pulleys mounted on the arm, a weighted lever fixed to the shaft whereby driving tension is normally maintained on the belt, a ratchet member fixed to the pulley supporting arm, a manually shiftable setting mechanism comprising a lever pivotally mounted on the said shaft adjacent the ratchet, a pawl pivotally mounted on the said lever, a stop member engagable by the pawl when the setting mechanism is in "on" position to retain the pawl free of the ratchet, and a shifting rod connected with the lever whereby the latter may be moved to release the pawl from the stop for engagement with the ratchet to effect movement of the tightening device whereby tension on the belt will be removed, and a weighted arm operatively connected with the pawl carrying lever whereby the latter will be yieldably held at either set position.

6. In a device of the class described, the combination with a driving belt and a belt tightening device comprising a freely rotatable, horizontal shaft, a rocker arm fixed to the shaft, pulleys on said arm engaging opposite sides of the belt and a weighted lever connected to rotate the shaft to normally maintain driving tension on the belt, of a setting mechanism comprising a ratchet member fixed to the rocker arm, a lever pivotally mounted on the shaft adjacent the ratchet, a pawl pivotally carried by the lever for engaging the ratchet, a setting rod connected with the lower end of the pawl carrying lever, an arm fixed to the upper end of the said lever, a supporting bar for said arm pivotally fixed thereto and to the said rod, a weight on said arm operable to yieldingly hold the parts in "on" or "off" position, a stop arm fixed to the shifting rod, a stop pin on said arm engageable with the pawl to retain it normally released from the ratchet and a rocker shaft connected with the shifting rod for moving the same from "on" position to "off" position whereby said pawl is released to engage with the ratchet to move the tightening device to "off" position.

Signed at Snoqualmie, Wash., this 21st day of October, 1922.

JAMES H. BERRYMAN